United States Patent
Ma et al.

(10) Patent No.: US 11,568,513 B2
(45) Date of Patent: Jan. 31, 2023

(54) IMAGE PROCESSING METHOD AND DEVICE FOR SPLICED PANEL, AND SPLICED PANEL

(71) Applicant: BOE TECHNOLOGY GROUP CO., LTD., Beijing (CN)

(72) Inventors: Xitong Ma, Beijing (CN); Naifu Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 421 days.

(21) Appl. No.: 16/643,204

(22) PCT Filed: Jul. 12, 2019

(86) PCT No.: PCT/CN2019/095767
§ 371 (c)(1),
(2) Date: Feb. 28, 2020

(87) PCT Pub. No.: WO2020/011249
PCT Pub. Date: Jan. 16, 2020

(65) Prior Publication Data
US 2020/0211155 A1    Jul. 2, 2020

(30) Foreign Application Priority Data

Jul. 13, 2018 (CN) .......................... 201810771533.8

(51) Int. Cl.
*G06T 3/20* (2006.01)
*G06T 7/32* (2017.01)
(Continued)

(52) U.S. Cl.
CPC ................ *G06T 3/20* (2013.01); *G06T 3/403* (2013.01); *G06T 7/32* (2017.01); *G09G 5/373* (2013.01); *G09G 2340/0442* (2013.01)

(58) Field of Classification Search
None
See application file for complete search history.

(56) References Cited

U.S. PATENT DOCUMENTS

| 9,047,039 B2 | 6/2015 | Perkins et al. |
| 2009/0147004 A1* | 6/2009 | Ramon ................. G09G 5/14 |
| | | 345/428 |

(Continued)

FOREIGN PATENT DOCUMENTS

| CN | 102427504 A | 4/2012 |
| CN | 102508628 A | 6/2012 |

(Continued)

OTHER PUBLICATIONS

First Office Action dated May 12, 2020 for application No. CN201810771533.8 with English Translation attached.

(Continued)

*Primary Examiner* — Aaron M Richer
(74) *Attorney, Agent, or Firm* — Nath, Goldberg & Meyer; Joshua B. Goldberg

(57) ABSTRACT

Image processing method and device for a spliced panel and a spliced panel are provided. The image processing method includes calculating a horizontal stretch coefficient of the spliced panel according to a resolution of the plurality of display units, a sum of horizontal spliced-gap widths of the spliced panel and a horizontal pixel pitch of the plurality of display units; calculating a vertical stretch coefficient of the spliced panel according to the resolution of the plurality of display units, a sum of vertical spliced-gap widths of the spliced panel and a vertical pixel pitch of the plurality of display units; stretching an original image to be displayed by the spliced panel according to the horizontal stretch coefficient and the vertical stretch coefficient to acquire a target (Continued)

image; and controlling display of the plurality of display units of the spliced panel according to the target image.

19 Claims, 5 Drawing Sheets

(51) Int. Cl.
*G06T 3/40* (2006.01)
*G09G 5/373* (2006.01)

(56) References Cited

U.S. PATENT DOCUMENTS

| | | |
|---|---|---|
| 2010/0201809 A1 | 8/2010 | Oyama et al. |
| 2013/0093646 A1 | 4/2013 | Curtis et al. |
| 2014/0168283 A1 | 6/2014 | Ouchi |
| 2014/0184472 A1 | 7/2014 | Xia et al. |
| 2015/0286457 A1 | 10/2015 | Kim et al. |
| 2016/0154926 A1* | 6/2016 | Szigeti .............. G06T 7/80 703/8 |
| 2016/0155410 A1* | 6/2016 | Nam .............. G06F 3/04842 715/745 |
| 2016/0163018 A1* | 6/2016 | Wang .............. G06F 3/1423 345/504 |
| 2017/0192733 A1* | 7/2017 | Huang .............. G06F 3/1446 |
| 2018/0232193 A1* | 8/2018 | Anderson .............. G06F 3/1446 |

FOREIGN PATENT DOCUMENTS

| | | |
|---|---|---|
| CN | 103797787 A | 5/2014 |
| CN | 103985084 A | 8/2014 |
| CN | 105446692 A | 3/2016 |
| CN | 105979164 A | 9/2016 |
| CN | 106373493 A | 2/2017 |
| CN | 107678722 A | 2/2018 |

OTHER PUBLICATIONS

Extended European Search Report dated Apr. 4, 2022 for application No. EP19834737.9.

* cited by examiner

IMAGE PROCESSING METHOD AND DEVICE FOR SPLICED PANEL, AND SPLICED PANEL

CROSS REFERENCE TO RELATED APPLICATIONS

This is a National Phase Application filed under 35 U.S.C. 371 as a national stage of PCT/CN2019/095767, filed on Jul. 12, 2019, an application claiming priority to Chinese patent application No. 201810771533.8, filed on Jul. 13, 2018, the entire contents of each of which are incorporated herein by reference.

TECHNICAL FIELD

The present disclosure relates to the field of display technology, and particularly relates to an image processing method for a spliced panel, an image processing device for a spliced panel, and a spliced panel.

BACKGROUND

With the rapid growth of social informatization, the demand for information visualization is also increased dramatically. An area of a display region provided by a single display unit (e.g., a single display) far from meeting user's requirements, and therefore a spliced panel including a plurality of display units is becoming more and more popular.

SUMMARY

Embodiments of the present disclosure provide an image processing method for a spliced panel, an image processing device for a spliced panel, and a spliced panel.

A first aspect of the present disclosure provides an image processing method for a spliced panel, wherein the spliced panel includes a plurality of display units arranged in an array, each of the plurality of display units includes a plurality of pixel units arranged in an array, and the image processing method includes:

calculating a horizontal stretch coefficient of the spliced panel according to a resolution of the plurality of display units, a sum of horizontal spliced-gap widths of the spliced panel and a horizontal pixel pitch of the plurality of display units;

calculating a vertical stretch coefficient of the spliced panel according to the resolution of the plurality of display units, a sum of vertical spliced-gap widths of the spliced panel and a vertical pixel pitch of the plurality of display units;

stretching an original image to be displayed by the spliced panel according to the horizontal stretch coefficient and the vertical stretch coefficient to acquire a target image; and controlling display of the plurality of display units of the spliced panel according to the target image.

In an embodiment, the sum of the horizontal spliced-gap widths and the sum of the vertical spliced-gap widths are acquired by:

acquiring the horizontal spliced-gap widths between every adjacent two of the display units in a same row and the vertical spliced-gap widths between every adjacent two of the display units in a same column;

calculating the sum of the horizontal spliced-gap widths according to the horizontal spliced-gap widths; and calculating the sum of the vertical spliced-gap widths according to the vertical spliced-gap widths.

In an embodiment, the plurality of display units of the spliced panel have a same resolution;

the horizontal pixel pitch is acquired by acquiring a pitch between any adjacent two of the pixel units, which are in a same row, of any one of the plurality of display units; and the vertical pixel pitch is acquired by acquiring a pitch between any adjacent two of the pixel units, which are in a same column, of any one of the plurality of display units.

In an embodiment, the controlling display of the plurality of display units of the spliced panel according to the target image includes:

calculating position information of vertex pixel units of each display unit according to the resolution of the plurality of display units, the horizontal pixel pitch, the vertical pixel pitch, the horizontal spliced-gap widths and the vertical spliced-gap widths;

extracting a sub-target image corresponding to each display unit from the target image according to the position information of the vertex pixel units of the display unit; and controlling the plurality of display units to display according to the sub-target images to be displayed by the plurality of display units.

In an embodiment, the controlling display of the plurality of display units of the spliced panel according to the target image includes:

calculating a number of pixel units that are suitable for being arranged in each of a horizontal spliced gap and a vertical spliced gap according to the horizontal pixel pitch, the vertical pixel pitch, the horizontal spliced-gap widths and the vertical spliced-gap widths;

acquiring a target resolution of the spliced panel according to the resolution of the plurality of display units and the calculated number of pixel units that are suitable for being arranged in each of a horizontal spliced gap and a vertical spliced gap;

establishing a two-dimensional coordinate system by taking a row direction of the display unit as an X axis and a column direction of the display units as a Y axis, wherein position information of each of the pixel units of each of the display units and position information of each of the pixel units that are suitable for being arranged in each of a horizontal spliced gap and a vertical spliced gap are both represented by a coordinate point (X, Y);

extracting a sub-target image corresponding to a region defined in the target image by four coordinate points of the pixel units at four vertexes of each of the plurality of display units, according to the four coordinate points; and controlling the plurality of display units to display according to the sub-target images to be displayed by the plurality of display units.

In an embodiment, the plurality of display units of the spliced panel have a same resolution;

the calculating a horizontal stretch coefficient of the spliced panel according to a resolution of the plurality of display units, a sum of horizontal spliced-gap widths of the spliced panel and a horizontal pixel pitch of the plurality of display units is performed by using a formula of $(Px+(Ht/M)/A)/Px$; and the calculating a vertical stretch coefficient of the spliced panel according to the resolution of the plurality of display units, a sum of vertical spliced-gap widths of the spliced panel and a vertical pixel pitch of the plurality of display units is performed by using a formula of $(Py+(Vt/N)/B)/Py$;

where Px is a number of the pixel units in a same row of each display unit, Py is a number of the pixel units in a same column of each display unit, Ht is the sum of the horizontal spliced-gap widths, Vt is the sum of the vertical spliced-gap widths, A is the horizontal pixel pitch, B is the vertical pixel pitch, and M and N are a number of columns and a number of rows of the array of the plurality of display units included in the spliced panel, respectively.

In an embodiment, the stretching an original image to be displayed by the spliced panel according to the horizontal stretch coefficient and the vertical stretch coefficient to acquire a target image includes:

stretching the original image to be displayed by the spliced panel through an interpolation algorithm according to the horizontal stretch coefficient and the vertical stretch coefficient to acquire the target image.

In an embodiment, the acquiring a pitch between any adjacent two of the pixel units, which are in a same row, of any one of the plurality of display units includes: acquiring the pitch by a ranging unit; and the acquiring a pitch between any adjacent two of the pixel units, which are in a same column, of any one of the plurality of display units includes: acquiring the pitch by a ranging unit.

A second aspect of the present disclosure provides an image processing device for a spliced panel, wherein the spliced panel includes a plurality of display units arranged in an array, each of the plurality of display units includes a plurality of pixel units arranged in an array, and the image processing device includes:

a central processing unit configured to calculate a horizontal stretch coefficient of the spliced panel according to a resolution of the plurality of display units, a sum of horizontal spliced-gap widths of the spliced panel and a horizontal pixel pitch of the plurality of display units; and calculate a vertical stretch coefficient of the spliced panel according to the resolution of the plurality of display units, a sum of vertical spliced-gap widths of the spliced panel and a vertical pixel pitch of the plurality of display units;

an image stretching unit configured to stretch an original image to be displayed by the spliced panel according to the horizontal stretch coefficient and the vertical stretch coefficient, to acquire a target image; and a controller configured to control display of the plurality of display units of the spliced panel according to the target image.

In an embodiment, the image processing device further includes:

a first ranging unit configured to acquire the horizontal spliced-gap widths between every adjacent two of the display units in a same row;

a second ranging unit configured to acquire the vertical spliced-gap widths between every adjacent two of the display units in a same column; and a first calculating unit configured to calculate the sum of the horizontal spliced-gap widths according to the horizontal spliced-gap widths, and calculate the sum of the vertical spliced-gap widths according to the vertical spliced-gap widths.

In an embodiment, the plurality of display units of the spliced panel have a same resolution;

the central processing unit is further configured to acquire a pitch between any adjacent two of the pixel units, which are in a same row, of any one of the plurality of display units, as the horizontal pixel pitch; and the central processing unit is further configured to acquire a pitch between any adjacent two of the pixel units, which are in a same column, of any one of the plurality of display units, as the vertical pixel pitch.

In an embodiment, the controller includes:

an analyzer configured to calculate position information of vertex pixel units of each of the display units according to the resolution of the plurality of display units, the horizontal pixel pitch, the vertical pixel pitch, the horizontal spliced-gap widths and the vertical spliced-gap widths;

an extractor configured to extract a sub-target image corresponding to each of the display units from the target image, according to the position information of the vertex pixel units of the display unit; and a control unit configured to control the plurality of display units to display, according to the sub-target images to be displayed by the plurality of display units.

In an embodiment, each of the first ranging unit and the second ranging unit includes an infrared ranging sensor or an infrared rangefinder.

In an embodiment, each of the first ranging unit and the second ranging unit includes an infrared emitter and an infrared receiver, the infrared emitter and the infrared receiver of the first ranging unit are on two opposite sides of each of the display units in a row direction, respectively, and the infrared emitter and the infrared receiver of the second ranging unit are on two opposite sides of each of the display units in a column direction, respectively.

In an embodiment, the first calculating unit is integrated in the central processing unit.

In an embodiment, the image stretching unit includes an FPGA.

In an embodiment, the controller includes at least one of a general purpose processor, a graphics processing unit (GPU), and a microprocessor.

A third aspect of the present disclosure provides a spliced panel, including the image processing device according to any one of the foregoing embodiments of the present disclosure.

In an embodiment, the spliced panel further includes the plurality of display units arranged in the array, wherein the plurality of display units are connected to the image stretching unit, respectively, and the image stretching unit is connected to the controller.

In an embodiment, the spliced panel further includes a memory for storing computer program instructions and data related to image processing, wherein the computer program instructions, when executed by the central processing unit, implement the first calculating unit and/or an acquisition unit.

DETAILED DESCRIPTION

To enable one of ordinary skill in the art to better understand the technical solutions of the present disclosure, the present disclosure will be further described in detail below with reference to the accompanying drawings and exemplary embodiments.

Figure 7:
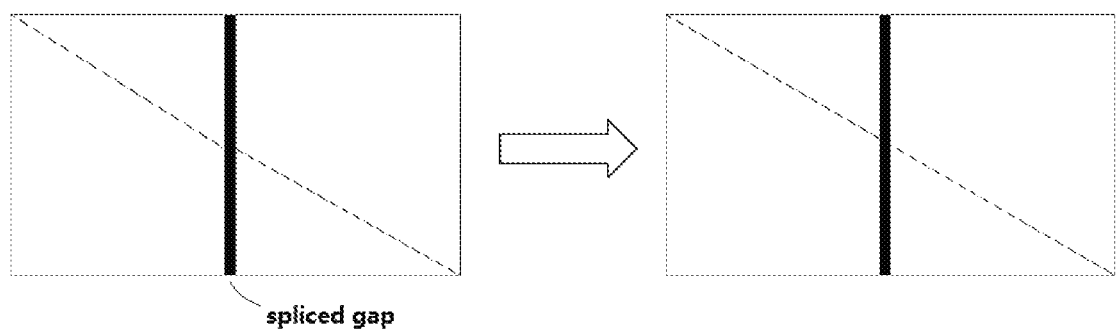
FIG. 7 is a schematic diagram showing the principle for reducing or eliminating misalignment of images displayed by a spliced panel according to the present inventive concepts.

The inventors of the present inventive concept have found that, in a spliced panel, a plurality of display units (e.g., a plurality of displays) may be spliced (or connected) to each other in an array to form the spliced panel. Since each of the plurality of display units is generally formed by a hemming manufacturing process (i.e., each of the plurality of display units has a peripheral region which cannot display information), a physical spliced gap (or a spliced seam) exists in the spliced panel formed by splicing the plurality of display units together. Although a size of the physical spliced gap is continuously decreased, the physical spliced gap cannot be completely eliminated from the above forming method for the spliced panel. Because the plurality of display units of the spliced panel cannot be spliced together with a spliced gap having a width of zero, defects such as misalignment and the like of the images displayed on the plurality of display units of the spliced panel will occur, and thus consistency of the entire image displayed by the spliced panel cannot not achieved. For example, the left part of FIG. 7 shows a case where the left half and the right half of one rectangular image are displayed on two display units, which are arranged side by side, included in a spliced panel, respectively. Due to the presence of a spliced gap (i.e., the thick vertical line in the left part of FIG. 7) in the spliced panel, a diagonal line of the rectangular image displayed by the spliced panel undergoes misalignment.

Accordingly, embodiments of the present disclosure provide an image processing method for a spliced panel, an image processing device for a spliced panel and a spliced panel, which can reduce or eliminate the above-described misalignment phenomenon (e.g., as shown in the right part of FIG. 7).

As shown in FIGS. 1 to 6, some embodiments of the present disclosure provide an image processing method for a spliced panel. For example, the spliced panel may include a plurality of display units 10 arranged in an array, and each of the plurality of display units 10 includes a plurality of pixel units arranged in an array (as exemplified in the lower right corner of FIG. 1). For ease of description, the image processing method according to the present embodiment will be described below by taking an example in which the spliced panel includes N×M (M and N are both positive integers) display units 10, and each of the display units 10 has a resolution of Px×Py (Px and Py are both positive integers) (i.e., each row of each display unit 10 has Px pixel units, and each column of each display unit 10 has Py pixel units). In an embodiment, the image processing method for the spliced panel may include the following steps S1 to S6. In another embodiment, the image processing method for the spliced panel may include only the following steps S4 to S6.

Step S1 may include acquiring horizontal spliced-gap widths Hb between every adjacent two of the display units 10 in a same row, and vertical spliced-gap widths Vb between every adjacent two of the display units 10 in a same column.

Specifically, in step S1, (M-1) horizontal spliced-gap widths Hb between every adjacent two of the M display units 10 in a same row may be acquired by a ranging unit (which may also be referred to as a distance measuring unit, and for example, may be an infrared ranging sensor or an infrared rangefinder) 21 (see FIGS. 4 and 6), and (N-1) vertical spliced-gap widths Vb between every adjacent two of the N display units 10 in a same column may be acquired by the ranging unit 21 in the same manner.

Step S2 may include calculating a sum Ht of the horizontal spliced-gap widths Hb according to the horizontal spliced-gap widths Hb, and a sum Vt of the vertical spliced-gap widths Vb according to the vertical spliced-gap widths Vb.

Specifically, in step S2, the (M-1) horizontal spliced-gap widths Hb acquired in step S1 may be summed by a first calculating unit 31 of a central processing unit (CPU) 30 (see FIGS. 4 and 6) to acquire the sum Ht of the (M-1) horizontal spliced-gap widths Hb. Similarly, the sum Vt of the (N-1) vertical spliced-gap widths Vb may be calculated by using the first calculating unit 31.

Step S3 may include, in a case where the plurality of display units 10 of the spliced panel have a same resolution, acquiring a pitch (e.g., a distance) between any adjacent two of the pixel units (e.g., between geometric centers of any adjacent two of the pixel units) in a same row of any one of the display units 10 as a horizontal pixel pitch A, and acquiring a pitch between any adjacent two of the pixel units in a same column of any one of the display units 10 as a vertical pixel pitch B.

In step S3, the horizontal pixel pitch A between any adjacent two of the pixel units in a same row and the vertical pixel pitch B between any adjacent two of the pixel units in a same column, which are stored in a memory 60 (see FIG. 6) in advance, may be directly acquired, for example, by using an acquisition unit 22 (e.g., a central processing unit, a general purpose processor, a microprocessor, etc.) (see FIGS. 4 and 6). Alternatively, it is also possible to measure the pitches between any adjacent two pixels of any one of the display units 10 by using a ranging unit having a distance measuring function (e.g., the ranging unit 21). It should be noted that, for ease of description, in the present embodiment, the distributions of the pixel units in the display units 10 are the same by default, i.e., each of the horizontal pixel pitches A in each of the display units 10 is constant and each of the vertical pixel pitches B in each of the display units 10 is constant. However, the present inventive concept can also be applied to a spliced panel formed by a plurality of display units 10 having different horizontal pixel pitches A and/or different vertical pixel pitches B.

Step S4 may include calculating a horizontal stretch coefficient (or horizontal stretch factor) of each of the display units 10 according to the resolution of the display unit 10, the sum Ht of the horizontal spliced-gap widths and the horizontal pixel pitch A; and calculating a vertical stretch coefficient (or vertical stretch factor) of each of the display units 10 according to the resolution of the display unit 10, the sum Vt of the vertical spliced-gap widths and the vertical pixel pitch B.

Figure 1:
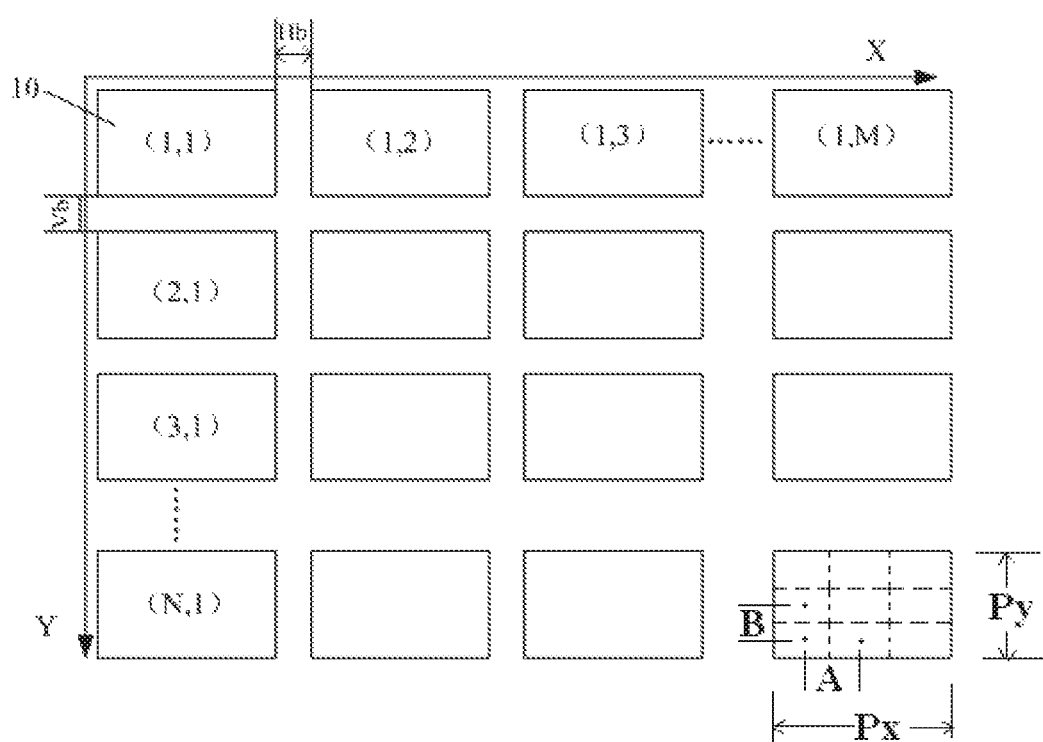
FIG. 1 is a schematic diagram showing an arrangement of display units of a spliced panel according to an embodiment of the present disclosure.
Figure 2:
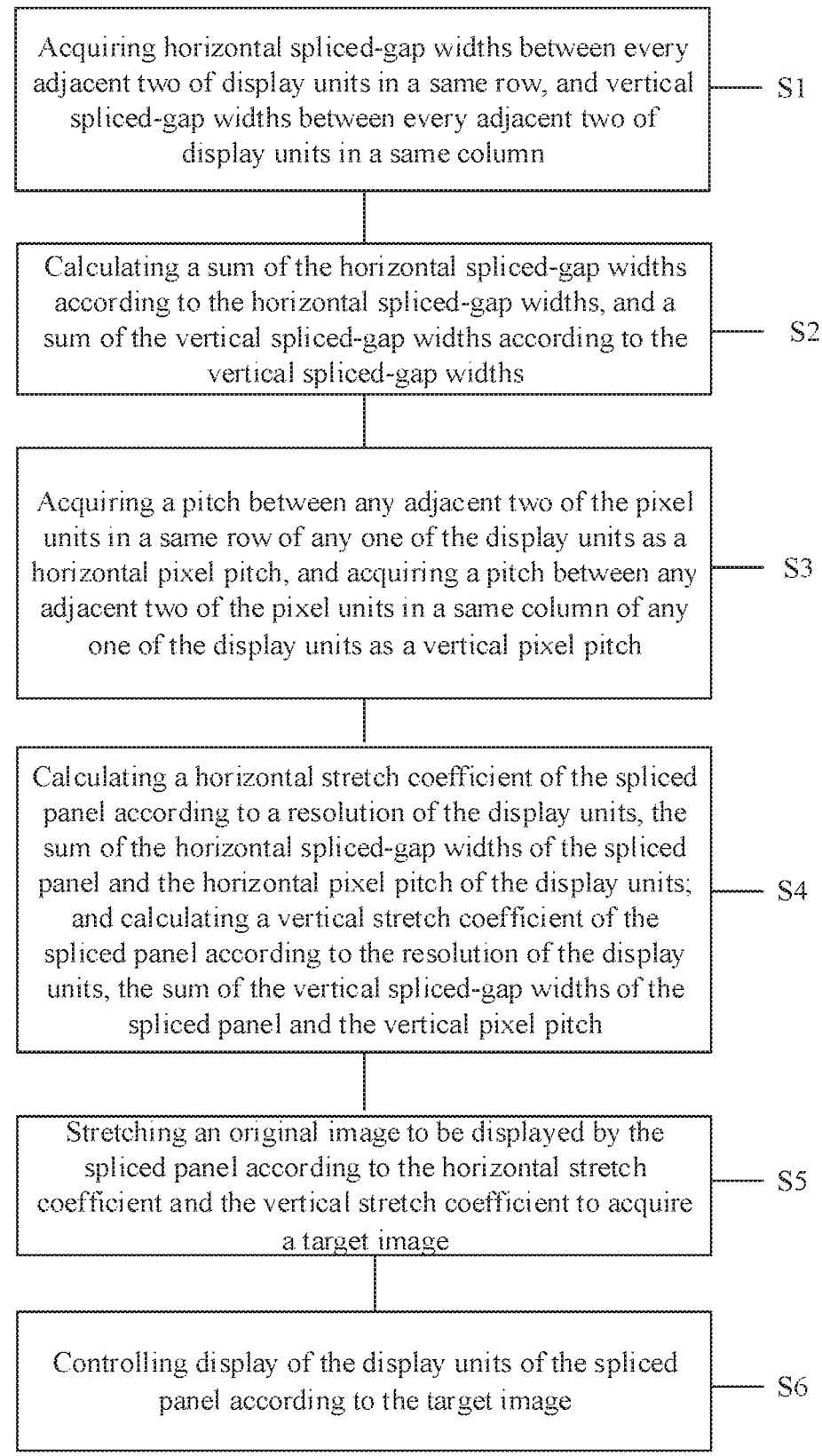
FIG. 2 is a schematic flowchart of an image processing method for a spliced panel according to an embodiment of the present disclosure.

It should be understood that, in a case where the plurality of display units 10 of the spliced panel have a same resolution, the horizontal stretch coefficient and the vertical stretch coefficient of each of the display units 10 are equal to a horizontal stretch coefficient and a vertical stretch coefficient of the entire spliced panel, respectively. In this case, in step S4, for example, the horizontal stretch coefficient of the spliced panel (i.e., of each of the display units 10) may be calculated according to a formula (Px+(Ht/M)/A)/Px, for example, by the central processing unit 30 or a second calculating unit 32 of the central processing unit 30 (see FIGS. 4 and 6); and the vertical stretch coefficient of the spliced panel (i.e. of each of the display units 10) may be calculated according to a formula (Py+(Vt/N)/B)/Py, for example, by the central processing unit 30 or the second calculating unit 32 of the central processing unit 30 (see FIGS. 4 and 6); where Px is the number (i.e., quantity) of pixel units in a same row of each display unit 10, Py is the number of pixel units in a same column of each display unit 10, Ht is the sum of the horizontal spliced-gap widths, Vt is the sum of the vertical spliced-gap widths, A is the horizontal pixel pitch, B is the vertical pixel pitch, and M and N are the number of columns and the number of rows of the array of the plurality of display units 10 included in the spliced panel, respectively (as shown in FIG. 1).

In a case where the plurality of display units 10 of the spliced panel have the same horizontal pixel pitch A and the same vertical pixel pitch B but different resolutions, in step S4, for example, the central processing unit 30 or the second calculating unit 32 of the central processing unit 30 (see FIGS. 4 and 6) may be adopted to calculate the horizontal stretch coefficient of the spliced panel according to a formula (Pxt+Ht/A)/Pxt, and to calculate the vertical stretch coefficient of the spliced panel according to a formula (Pyt+Vt/B)/Pyt, where Pxt is the number of pixel units of all the display units 10 in a same row, Pyt is the number of pixel units in all the display units 10 in a same column, Ht is the sum of the horizontal spliced-gap widths, Vt is the sum of the vertical spliced-gap widths, A is the horizontal pixel pitch, and B is the vertical pixel pitch.

Step S5 may include stretching an original image to be displayed by (or on) the spliced panel according to the horizontal stretch coefficient and the vertical stretch coefficient to acquire a target image; wherein a size of the target image acquired by the stretching is the same as that of the spliced panel. For example, the size of the spliced panel includes areas of the display regions of the plurality of display units 10 included in the spliced panel as well as areas of a plurality of horizontal spliced gaps and a plurality of vertical spliced gaps as shown in FIG. 1.

In step S5, the original image to be displayed by the spliced panel may be stretched (or enlarged), for example by using an interpolation algorithm, according to the horizontal stretch coefficient and the vertical stretch coefficient, so as to acquire the target image. For example, the interpolation algorithm may be a bilinear interpolation algorithm or a bicubic interpolation algorithm. Alternatively, an image stretching algorithm is not limited to the above algorithms, as long as the original image to be displayed can be stretched according to the horizontal stretch coefficient and the vertical stretch coefficient.

Specifically, an image stretching unit (e.g., a field programmable gate array (FPGA)) 40 (see FIGS. 4 and 6) may be used for stretching the original image to be displayed by the spliced panel. For example, in the case where the plurality of display units 10 of the spliced panel have the same resolution, a resolution of the original image to be displayed before stretching may be equal to a sum of the resolutions of the plurality of display units 10, i.e., the resolution of the original image to be displayed is (M×Px)×(N×Py). In this case, the resolution of the target image acquired after stretching according to the horizontal stretch coefficient and the vertical stretch coefficient acquired in step S4 is (M×Px×Ht/A)×(N×Py+Vt/B).

Step S6 may include controlling display of each of the display units 10 of the spliced panel according to the target image.

Figure 3:
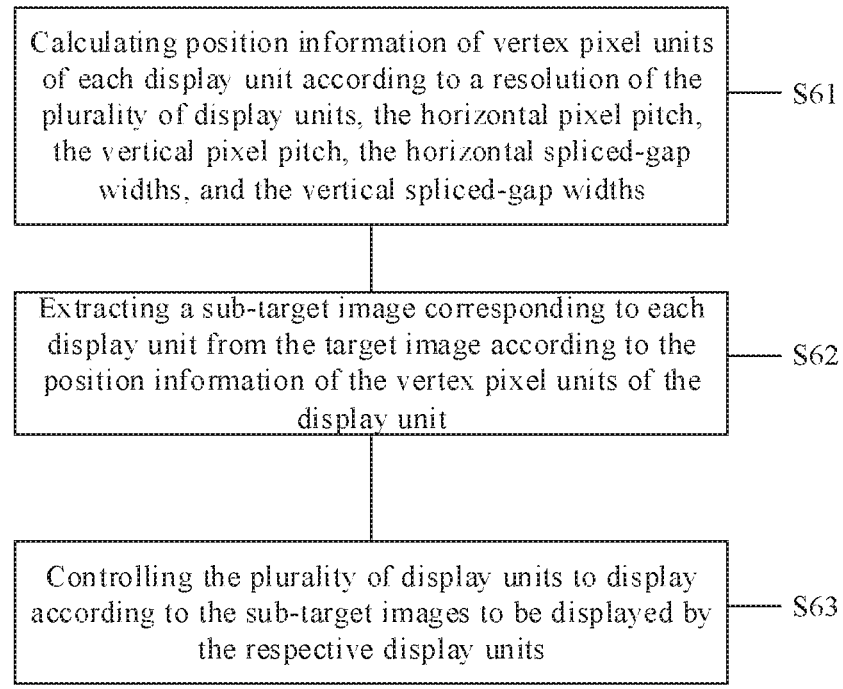
FIG. 3 is a schematic flowchart of step S6 of the image processing method for a spliced panel according to the embodiment shown in FIG. 2.

As shown in FIG. 3, in an embodiment, step S6 may include the following steps S61 to S63.

Step S61 may include calculating position information of each vertex pixel unit (i.e., a pixel unit at each of vertexes) of each display unit 10 according to the resolution of the plurality of display units 10, the horizontal pixel pitch A, the vertical pixel pitch B, the horizontal spliced-gap widths Hb, and the vertical spliced-gap widths Vb.

In step S61, in a case where a width between any adjacent two of the display units 10 in a same row is the spliced-gap width Hb and a width between any adjacent two of the display units 10 in a same column is the spliced-gap width Vb. In this case, since the horizontal pixel pitch A between any adjacent two of the pixel units in a same row and the vertical pixel pitch B between any adjacent two of the pixel units in a same column have been acquired in step S3, at this time it is possible to acquire the number of pixel units that can be (or that are suitable for being) set at a position of each spliced gap. As shown in FIG. 1, a two-dimensional coordinate system may be established having the row direction of the display units 10 as an X-axis and the column direction of the display units 10 as a Y-axis. For example, the position information of each pixel unit of each display unit 10, and the position information of each of the pixel units that can be set at the position of each of the horizontal spliced-gap width Hb and the vertical spliced-gap width Vb may all be represented by coordinate points (x, y), and thus the coordinate points of the pixel units at four vertexes (i.e., the upper left corner, the upper right corner, the lower left corner, and the lower right corner) of each of the display units 10 may be acquired. For example, for the second display unit 10 in the first row (i.e., array element (1, 2) shown in FIG. 1), the coordinates of the pixel unit at the upper left corner are (Px+Hb/A, 1), the coordinates of the pixel unit at the upper right corner are (2Px+Hb/A, 1), the coordinates of the pixel unit at the lower left corner are (Px+Hb/A, Py), and the coordinates of the pixel unit at the lower right corner are (2Px+Hb/A, Py). The coordinates of the pixel units at the four vertexes of each of the display units 10 may be calculated in this manner.

In step S62, a sub-target image corresponding to each display unit 10 is extracted (e.g., by cutting) from the target image according to the position information of each of the vertex pixel units of the display unit 10. It should be understood that the sub-target image obtained in this step is a rectangular region defined in the target image by the coordinate points of the vertex pixel units of the corresponding display unit 10. A size of each rectangular region is equal to a size of the display region of the display unit 10 corresponding to the rectangular region.

In this step, the region defined by the coordinates of the pixel units at the four vertexes of each display unit 10 acquired in the above step may be extracted from the target image by an extractor 52 of a controller (e.g., a general processor, a microprocessor, a graphics processing unit (GPU), etc.) 50 (see FIG. 6), to acquire the sub-target image to be displayed by the display unit 10.

Step S63 may include controlling the plurality of display units 10 to display according to the sub-target images to be displayed by the respective display units 10. For example, the size of each of the sub-target images may be equal to the size of the corresponding display unit 10, and the resolution of each of the sub-target images may be equal to the resolution of the corresponding display unit 10.

The image processing method (or image display method) for the spliced panel according to some embodiments of the present disclosure has been described above.

It should be noted that, in the above steps, step S1 and step S3 may be combined into one step to simultaneously acquire the spliced-gap widths Hb and Vb and the pixel pitches A and B, or the pixel pitches A and B may be acquired first and then the spliced-gap widths Hb and Vb are acquired.

In the image processing method for the spliced panel according to the present embodiment, pixel units are virtualized at the position of the spliced gap between any adjacent two of the display units 10, and then the original image to be displayed is stretched to acquire the target image suitable for being displayed on the spliced panel. Thereafter, the plurality of display units 10 are controlled to display according to the target image. Therefore, a display image with relatively uniform image quality can be acquired, and the problem of image misalignment caused by a spliced gap of a spliced panel is effectively solved.

Figure 4:
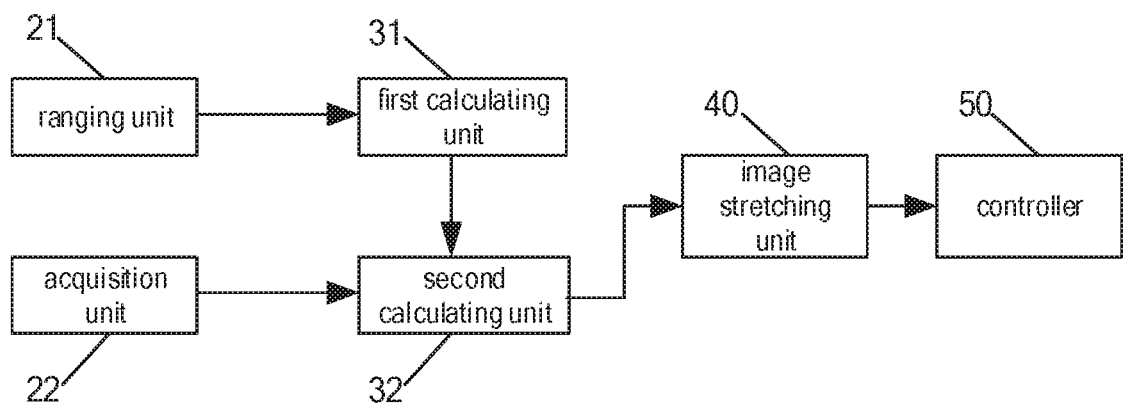
FIG. 4 is a schematic diagram showing a structure of an image present disclosure.
Figure 5:
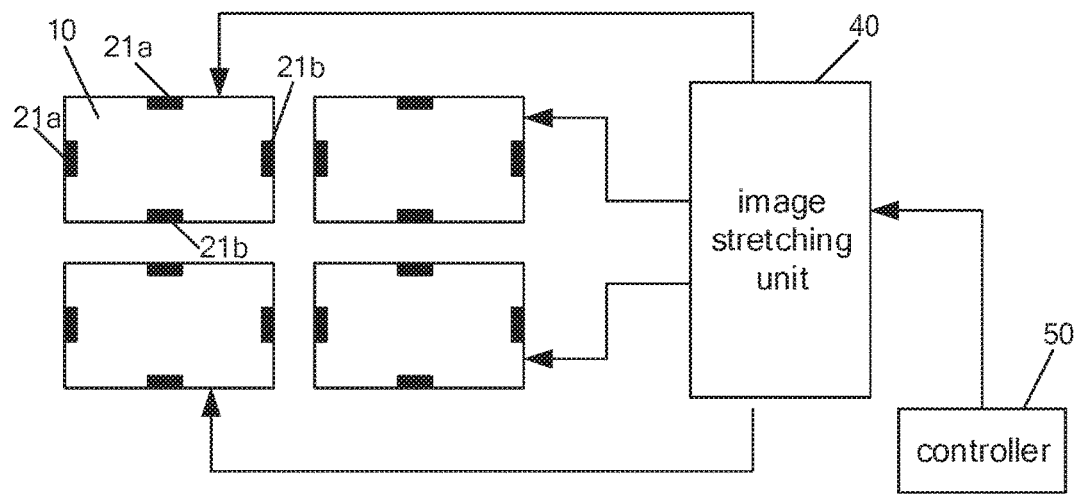
FIG. 5 is a schematic diagram showing a structure in which an image processing device for a spliced panel is combined with a plurality of display units, according to an embodiment of the present disclosure.
Figure 6:
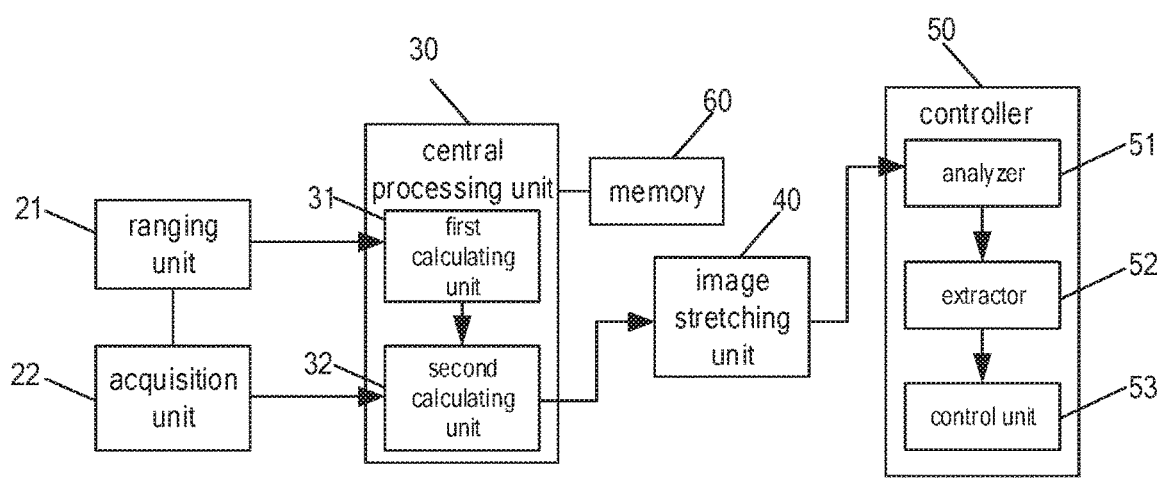
FIG. 6 is a schematic diagram showing another structure of an image processing device for a spliced panel according to an embodiment of the present disclosure.

Embodiments of the present disclosure provide an image processing device for a spliced panel, and a spliced panel including the image processing device, as shown in FIGS. 4 to 6. For example, the spliced panel includes the plurality of display units 10 arranged in the array, and each of the display units 10 includes the plurality of pixel units arranged in the array. The image processing device may process an original image to be displayed on the spliced panel by using the image processing method according to the embodiments corresponding to FIGS. 2 and 3.

As shown in FIGS. 4 to 6, the image processing device according to the present embodiment may include the ranging unit 21, the acquisition unit 22, the first calculating unit 31, the second calculating unit 32, the image stretching unit 40, and the controller 50. For example, the ranging unit 21 may acquire the horizontal spliced-gap widths Hb between every adjacent two of the display units 10 in a same row and the vertical spliced-gap widths Vb between every adjacent two of the display units 10 in a same column. The first calculating unit 31 may calculate the sum Ht of the horizontal spliced-gap widths according to the horizontal spliced-gap widths Hb, and calculate the sum Vt of the vertical spliced-gap widths according to the vertical spliced-gap widths Vb. The acquisition unit 22 may acquire the horizontal pixel pitch A between any adjacent two of the pixel units in a same row and the vertical pixel pitch B between any adjacent two of the pixel units in a same column of any one of the display units 10. The second calculating unit 32 may calculate a horizontal stretch coefficient of the spliced panel according to the resolution of each display unit 10, the sum Ht of the horizontal spliced-gap widths of the spliced panel, and the horizontal pixel pitch A; and calculate a vertical stretch coefficient of the spliced panel according to the resolution of each display unit 10, the sum Vt of the vertical spliced-gap widths of the spliced panel and the vertical pixel pitch B. The image stretching unit 40 may stretch an original image to be displayed on the spliced panel according to the horizontal stretch coefficient and the vertical stretch coefficient, to acquire a target image. The controller 50 may control the plurality of display units 10 of the spliced panel to display information, according to the target image.

The components of the image processing device will be further described below.

For example, the ranging unit 21 according to the present embodiment may be an infrared ranging sensor or an infrared rangefinder. In an embodiment, each ranging unit 21 may include an infrared emitter 21a and an infrared receiver 21b. The infrared emitter 21a and the infrared receiver 21b of one ranging unit 21 (e.g., a first ranging unit) may be disposed on two opposite sides of each of the display units 10 in the row direction, respectively, and the infrared emitter 21a and the infrared receiver 21b of one ranging unit 21 (e.g., a second ranging unit) may be disposed on two opposite sides of each of the display units 10 in the column direction, respectively, such that a light receiving surface of each of the infrared receivers 21b is aligned with the corresponding spliced gap. Furthermore, each of the ranging units 21 is connected to the central processing unit 30. Thus, the central processing unit 30 may control each ranging unit 21 to emit infrared rays through the infrared emitter 21a of the ranging unit 21 and to receive the emitted infrared rays through the infrared receiver 21b of the ranging unit 21. The central processing unit 30 may calculate a distance between each infrared receiver 21b and the corresponding infrared emitter 21a according to a time duration between the time point when the infrared rays are received and the time point when the infrared rays are emitted and the propagation speed of the infrared rays, and subtract a width or a height of the corresponding display unit 10 from the distance, to acquire the horizontal spliced-gap width Hb or the vertical spliced-gap width Vb. In this way, the spliced-gap width Hb or Vb between any adjacent two of the display units 10 can be measured. Alternatively, the ranging unit 21 for measuring a distance is not limited to the infrared ranging sensor or the infrared rangefinder, and may be other elements having a distance measuring function (e.g., a telemeter).

For example, the first calculating unit 31 and the second calculating unit 32 according to the present embodiment may be integrated in a same calculating unit. Each of the calculating units may be, for example, a central processing unit (or a general purpose processor, a digital signal processor, a microprocessor, etc.) 30. That is, the functions of each of the first calculating unit 31 and the second calculating unit 32 may be implemented by the central processing unit 30 (as shown in FIG. 6).

For example, the image stretching unit 40 according to the present embodiment may include an FPGA. However, the image stretching unit 40 is not limited to the FPGA, and may be another logic programmable element having the function of the image stretching unit 40.

For example, the controller 50 (e.g., a general processor, a microprocessor, a GPU, etc.) may include an analyzer 51, an extractor 52 and a control unit 53, as shown in FIG. 6. Further, the image processing device may further include a memory (e.g., a nonvolatile memory) 60 connected to the central processing unit 30. In an embodiment, the controller 50 may function as the analyzer 51, the extractor 52 and the control unit 53 by executing computer program instructions stored in the memory 60 by the central processing unit 30, a general purpose processor, a microprocessor, or the like. In an embodiment, the computer program instructions may be stored in the memory 60, and the computer program instructions, when executed by the central processing unit 30, may cause the central processing unit 30 to function as the first calculating unit 31, the second calculating unit 32 and the acquisition unit. In an embodiment, the central processing unit 30 may control the overall operation of the image processing device or the spliced panel.

Specifically, the analyzer 51 may calculate position information of each vertex pixel unit of each display unit 10, according to the resolution of the display unit 10, the horizontal pixel pitch A, the vertical pixel pitch B, the horizontal spliced-gap widths Hb, and the vertical spliced-gap widths Vb. The extractor 52 may extract a sub-target image corresponding to each display unit 10 from the target image, according to the position information of each vertex pixel unit of the display unit 10. The control unit 53 may control each display unit 10 to display information according to the sub-target image to be displayed by the corresponding display unit 10.

For example, the analyzer 51 may calculate the number of pixel units that can be set in each of the horizontal spliced-gap width Hb and the vertical spliced-gap width Vb, according to the horizontal pixel pitch A, the vertical pixel pitch B, the horizontal spliced-gap widths Hb, and the vertical spliced-gap widths Vb; and may calculate a target resolution of the spliced panel according to the resolution of each display unit 10 and the calculated number of pixel units that can be set in each of the horizontal spliced-gap width Hb and the vertical spliced-gap width Vb. Alternatively, the analyzer 51 may also establish the two-dimensional coordinate system having the row direction of the display units 10 as the X axis and the column direction of the display units 10 as the Y axis. For example, the positional information of each pixel unit of each display unit 10 and the positional information of each of the pixel units that can be set in each of the horizontal spliced-gap width Hb and the vertical spliced-gap width Vb are represented in the form of a coordinate point (x, y), respectively. After the information of the coordinate points of the pixel units is acquired, the information of the coordinate points of the pixel units at the four vertexes of each display unit 10 is extracted. In this way, the extractor 52 may extract a sub-target image corresponding to the region defined by the four coordinate points from the target image according to the coordinate points of the pixel unit at the four vertexes of each display unit 10. It should be understood that, the region extracted by the extractor 52 is a rectangular region defined by the coordinate points of four vertex pixel units of each display unit 10. A size of each rectangular region may be equal to a size of the display region of the display unit 10 corresponding to the rectangular region. Then, the control unit 53 may control the display units 10 to display information according to the sub-target images to be displayed by the respective display units 10. For example, a size of each of the sub-target images may be equal to a size of the display region of the corresponding display unit 10, and a resolution of each of the sub-target images may be equal to a resolution of the corresponding display unit 10.

In the image processing device for the spliced panel according to the present embodiment, pixel units are virtualized at the position of the spliced gap between any adjacent two of the display units 10, and then an original image to be displayed is stretched to acquire a target image suitable for being displayed on the spliced panel. Thereafter, the plurality of display units 10 of the spliced panel are controlled to display the target image together, according to the target image. Therefore, a display image with relatively uniform image quality can be acquired, and the problem of image misalignment caused by a spliced gap of the spliced panel is effectively solved.

Correspondingly, embodiments of the present disclosure provide a spliced panel, as shown in FIG. 5. The spliced panel may include the image processing device according to the embodiment of FIG. 4 or 6 and the plurality of display units 10. For example, the plurality of display units 10 may be connected to the image stretching unit 40, respectively, and the image stretching unit 40 may be connected to the controller 50. It should be understood that although not shown in FIG. 5, the central processing unit 30 and the memory 60 as shown in FIG. 6 may be further included in the spliced panel shown in FIG. 5. As described above, the spliced panel can effectively reduce or eliminate the image misalignment caused by a spliced gap of a known spliced panel.

It should be understood that each of the display unit 10 in the present disclosure may be a display device such as a liquid crystal display device, an organic light emitting diode (OLED) display device, or the like. Further, the embodiments described above may be combined with each other in a case where there is no explicit conflict.

It is to be understood that the above embodiments are merely exemplary embodiments for explaining the principle of the present disclosure, and that the present disclosure is not limited thereto. It will be apparent to one of ordinary skill in the art that various changes and modifications can be made therein without departing from the spirit and essence of the present disclosure, and these changes and modifications also fall within the scope of the present disclosure.

What is claimed is:

1. An image processing method for a spliced panel, wherein the spliced panel comprises a plurality of display units arranged in an array, each of the plurality of display units comprises a plurality of pixel units arranged in an array, and the image processing method comprises:

calculating a horizontal stretch coefficient of the spliced panel according to a resolution of the plurality of display units, a sum of horizontal spliced-gap widths of the spliced panel and a horizontal pixel pitch of the plurality of display units;

calculating a vertical stretch coefficient of the spliced panel according to the resolution of the plurality of display units, a sum of vertical spliced-gap widths of the spliced panel and a vertical pixel pitch of the plurality of display units;

stretching an original image to be displayed by the spliced panel according to the horizontal stretch coefficient and the vertical stretch coefficient to acquire a target image; and controlling display of the plurality of display units of the spliced panel according to the target image, wherein the plurality of display units of the spliced panel have a same resolution;

the calculating a horizontal stretch coefficient of the spliced panel according to a resolution of the plurality of display units, a sum of horizontal spliced-gap widths of the spliced panel and a horizontal pixel pitch of the plurality of display units is performed by using a formula of $(Px+(Ht/M)/A)/Px$; and the calculating a vertical stretch coefficient of the spliced panel according to the resolution of the plurality of display units, a sum of vertical spliced-gap widths of the spliced panel and a vertical pixel pitch of the plurality of display units is performed by using a formula of $(Py+(Vt/N)/B)/Py$;

where Px is a number of the pixel units in a same row of each display unit, Py is a number of the pixel units in a same column of each display unit, Ht is the sum of the horizontal spliced-gap widths, Vt is the sum of the vertical spliced-gap widths, A is the horizontal pixel pitch, B is the vertical pixel pitch, and M and N are a number of columns and a number of rows of the array of the plurality of display units included in the spliced panel, respectively.

2. The image processing method according to claim 1, wherein the sum of the horizontal spliced-gap widths and the sum of the vertical spliced-gap widths are acquired by:
acquiring the horizontal spliced-gap widths between every adjacent two of the display units in a same row and the vertical spliced-gap widths between every adjacent two of the display units in a same column;
calculating the sum of the horizontal spliced-gap widths according to the horizontal spliced-gap widths; and
calculating the sum of the vertical spliced-gap widths according to the vertical spliced-gap widths.

3. The image processing method according to claim 2, wherein the controlling display of the plurality of display units of the spliced panel according to the target image comprises:
calculating position information of vertex pixel units of each display unit according to the resolution of the plurality of display units, the horizontal pixel pitch, the vertical pixel pitch, the horizontal spliced-gap widths and the vertical spliced-gap widths;
extracting a sub-target image corresponding to each display unit from the target image according to the position information of the vertex pixel units of the display unit; and
controlling the plurality of display units to display according to the sub-target images to be displayed by the plurality of display units.

4. The image processing method according to claim 2, wherein the controlling display of the plurality of display units of the spliced panel according to the target image comprises:
calculating a number of pixel units that are suitable for being arranged in each of a horizontal spliced gap and a vertical spliced gap according to the horizontal pixel pitch, the vertical pixel pitch, the horizontal spliced-gap widths and the vertical spliced-gap widths;
acquiring a target resolution of the spliced panel according to the resolution of the plurality of display units and the calculated number of pixel units that are suitable for being arranged in each of a horizontal spliced gap and a vertical spliced gap;
establishing a two-dimensional coordinate system by taking a row direction of the display unit as an X axis and a column direction of the display units as a Y axis, wherein position information of each of the pixel units of each of the display units and position information of each of the pixel units that are suitable for being arranged in each of a horizontal spliced gap and a vertical spliced gap are both represented by a coordinate point (X, Y);
extracting a sub-target image corresponding to a region defined in the target image by four coordinate points of the pixel units at four vertexes of each of the plurality of display units, according to the four coordinate points; and
controlling the plurality of display units to display according to the sub-target images to be displayed by the plurality of display units.

5. The image processing method according to claim 1, wherein
the horizontal pixel pitch is acquired by acquiring a pitch between any adjacent two of the pixel units, which are in a same row, of any one of the plurality of display units; and
the vertical pixel pitch is acquired by acquiring a pitch between any adjacent two of the pixel units, which are in a same column, of any one of the plurality of display units.

6. The image processing method according to claim 5, wherein the acquiring a pitch between any adjacent two of the pixel units, which are in a same row, of any one of the plurality of display units comprises: acquiring the pitch by a ranging unit; and
the acquiring a pitch between any adjacent two of the pixel units, which are in a same column, of any one of the plurality of display units comprises: acquiring the pitch by a ranging unit.

7. The image processing method according to claim 1, wherein the stretching an original image to be displayed by the spliced panel according to the horizontal stretch coefficient and the vertical stretch coefficient to acquire a target image comprises:
stretching the original image to be displayed by the spliced panel through an interpolation algorithm according to the horizontal stretch coefficient and the vertical stretch coefficient to acquire the target image.

8. An image processing device for a spliced panel, wherein the spliced panel comprises a plurality of display units arranged in an array, each of the plurality of display units comprises a plurality of pixel units arranged in an array, and the image processing device comprises:
a central processing unit configured to calculate a horizontal stretch coefficient of the spliced panel according to a resolution of the plurality of display units, a sum of horizontal spliced-gap widths of the spliced panel and a horizontal pixel pitch of the plurality of display units; and calculate a vertical stretch coefficient of the spliced panel according to the resolution of the plurality of display units, a sum of vertical spliced-gap widths of the spliced panel and a vertical pixel pitch of the plurality of display units;
an image stretching unit configured to stretch an original image to be displayed by the spliced panel according to the horizontal stretch coefficient and the vertical stretch coefficient, to acquire a target image; and
a controller configured to control display of the plurality of display units of the spliced panel according to the target image,
wherein the plurality of display units of the spliced panel have a same resolution;
the central processing unit is further configured to calculate the horizontal stretch coefficient of the spliced panel according to the resolution of the plurality of display units, the sum of horizontal spliced-gap widths of the spliced panel and the horizontal pixel pitch of the plurality of display units by using a formula of (Px+(Ht/M)/A)/Px; and
the central processing unit is further configured to calculate the vertical stretch coefficient of the spliced panel according to the resolution of the plurality of display units, the sum of vertical spliced-gap widths of the spliced panel and the vertical pixel pitch of the plurality of display units by using a formula of (Py+(Vt/N)/B)/Py;
where Px is a number of the pixel units in a same row of each display unit, Py is a number of the pixel units in a same column of each display unit, Ht is the sum of the horizontal spliced-gap widths, Vt is the sum of the vertical spliced-gap widths, A is the horizontal pixel pitch, B is the vertical pixel pitch, and M and N are a number of columns and a number of rows of the array of the plurality of display units included in the spliced panel, respectively.

9. The image processing device according to claim 8, further comprising:
   a first ranging unit configured to acquire the horizontal spliced-gap widths between every adjacent two of the display units in a same row;
   a second ranging unit configured to acquire the vertical spliced-gap widths between every adjacent two of the display units in a same column; and
   a first calculating unit configured to calculate the sum of the horizontal spliced-gap widths according to the horizontal spliced-gap widths, and calculate the sum of the vertical spliced-gap widths according to the vertical spliced-gap widths.

10. The image processing device according to claim 9, wherein each of the first ranging unit and the second ranging unit comprises an infrared ranging sensor or an infrared rangefinder.

11. The image processing device according to claim 9, wherein each of the first ranging unit and the second ranging unit comprises an infrared emitter and an infrared receiver, the infrared emitter and the infrared receiver of the first ranging unit are on two opposite sides of each of the display units in a row direction, respectively, and the infrared emitter and the infrared receiver of the second ranging unit are on two opposite sides of each of the display units in a column direction, respectively.

12. The image processing device according to claim 9, wherein the first calculating unit is integrated in the central processing unit.

13. The image processing device according to claim 8, wherein
   the central processing unit is further configured to acquire a pitch between any adjacent two of the pixel units, which are in a same row, of any one of the plurality of display units, as the horizontal pixel pitch; and
   the central processing unit is further configured to acquire a pitch between any adjacent two of the pixel units, which are in a same column, of any one of the plurality of display units, as the vertical pixel pitch.

14. The image processing device according to claim 8, wherein the controller comprises:
   an analyzer configured to calculate position information of vertex pixel units of each of the display units according to the resolution of the plurality of display units, the horizontal pixel pitch, the vertical pixel pitch, the horizontal spliced-gap widths and the vertical spliced-gap widths;
   an extractor configured to extract a sub-target image corresponding to each of the display units from the target image, according to the position information of the vertex pixel units of the display unit; and
   a control unit configured to control the plurality of display units to display, according to the sub-target images to be displayed by the plurality of display units.

15. The image processing device according to claim 8, wherein the image stretching unit comprises an FPGA.

16. The image processing device according to claim 8, wherein the controller comprises at least one of a general purpose processor, a graphics processing unit (GPU), and a microprocessor.

17. A spliced panel, comprising the image processing device according to claim 8.

18. The spliced panel according to claim 17, further comprising the plurality of display units arranged in the array, wherein the plurality of display units are connected to the image stretching unit, respectively, and the image stretching unit is connected to the controller.

19. The spliced panel according to claim 17, further comprising a memory for storing computer program instructions and data related to image processing, wherein the computer program instructions, when executed by the central processing unit, implement a first calculating unit for calculating the sum of horizontal spliced-gap widths and the sum of vertical spliced-gap widths and/or an acquisition unit.

* * * * *